United States Patent [19]

Böse et al.

[11] Patent Number: 4,885,111

[45] Date of Patent: Dec. 5, 1989

[54] BRANCHED, QUATERNARY POLYOXYALKYLENE COPOLYESTERS, A PROCESS FOR THEIR PREPARATION, AND THEIR USE

[75] Inventors: Wllibald Böse; Manfred Hofinger, both of Burgkirchen; Martin Hille, Liederbach; Roland Böhm, Kelkheim; Friedrich Staiss, Wiesbaden, all of Fed. Rep. of Germany

[73] Assignee: Hoechst Aktiengesellschaft, Frankfurt am Main, Fed. Rep. of Germany

[21] Appl. No.: 119,823

[22] Filed: Nov. 12, 1987

[30] Foreign Application Priority Data

Nov. 13, 1986 [DE] Fed. Rep. of Germany ....... 3638744

[51] Int. Cl.$^4$ .................... B01D 17/00; B01D 19/04
[52] U.S. Cl. .................................... 252/344; 252/341; 252/358

[58] Field of Search ............... 252/319, 328, 331, 334, 252/336, 341, 344

[56] References Cited

U.S. PATENT DOCUMENTS 3,009,884 11/1961 Monson et al. ..................... 252/341

Primary Examiner—Josephine Barr

[57] ABSTRACT

Branched, quaternary polyoxyalkylene copolyesters are described which are prepared by esterifying an oxyalkylated primary fatty amine and an at least trihydric oxyalkylated alkanol or an oxyalkylated polyamine using a dicarboxylic acid or a dicarboxylic anhydride with polycondensation, and quaternizing the esterification product obtained using ethylene oxide or propylene oxide in the presence of a mineral acid or carboxylic acid. The novel, branched, quaternary polyoxyalkylene copolyesters are used as demulsifiers and corrosion inhibitors in the processing of crude oil emulsions.

15 Claims, No Drawings

BRANCHED, QUATERNARY POLYOXYALKYLENE COPOLYESTERS, A PROCESS FOR THEIR PREPARATION, AND THEIR USE

DESCRIPTION

The invention relates to branched, quaternary polyoxyalkylene copolyesters, a process for their preparation, and their use as corrosion inhibitors and demulsifiers for crude-oil emulsions.

In the recovery of crude oil, corrosion of the pumping equipment, pipelines and preparation plants represents a problem which increases more and more over the exploitation period of a crude oil field. Whereas almost exclusively pure crude oil is recovered from a newly tapped oil field in the initial phase, the water content of the recovered oil increases after a certain time. The crude oils contain corrosive components, such as electrolytes, hydrogen sulfide and carbon dioxide. Whereas the pure crude oil recovered in the initial phase hardly leads to corrosion problems, the latter increase considerably as the water content increases. The water, which is distributed in emulsion-like fashion in the crude oil, must be substantially separated from the latter before further transport through pipelines or in tank cars or ships. For this purpose so-called demulsifiers or emulsion breakers are added to the water-containing crude oil. Although these substances do not themselves have a corroding action, they promote wetting by water in the plant and thus give an indirect impetus to corrosion.

It has already been attempted to eliminate this disadvantage by adding suitable corrosion inhibitors. In addition to the cost factor which is caused by employing such inhibitors, most of these products have the disadvantage that they have an emulsifying or emulsion-stabilizing action themselves, which can only be compensated for by increasing the amount of demulsifier necessary for maximum removal of water. Cationic compounds which, in addition to their action as corrosion inhibitors, simultaneously also have good demulsifying properties, have been employed in the past. Such compounds have been disclosed, for example, by German Auslegeschrift No. 2,238,995 and German Offenlegungsschrift No. 3,136,298. Some of them exhibit good demulsifying actions, but overall leave something to be desired. Accordingly, there continues to be a demand for demulsifiers which have an inherent corrosion-inhibiting action.

The present invention provides improved agents for the purpose mentioned. These are specific branched and quaternary polyoxyalkylene copolyesters. The polyoxyalkylene copolyesters according to the invention have been prepared by esterifying an oxyalkylated primary fatty amine of the formula

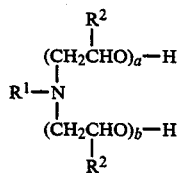

in which $R^1$ is an alkyl radical or alkylene radical having 8 to 23 carbon atoms, $R^2$ is H or $CH_3$ and, in the polyoxyalkylene radical chain, arranged in blocks, can also adopt both meanings, and a and b are identical or different and are integers or fractions with a total of 2 to 30, with the proviso that neither a nor b is zero, and an at least trihydric alkanol or a polyamine which in each case contains 5 to 30, preferably 15 to 25, ethylene oxide units, 5 to 30, preferably 15 to 25, propylene oxide units, or 3 to 20, preferably 5 to 15, ethylene oxide units and 5 to 30, preferably 15 to 25, propylene oxide units per acidic H atom, using a dicarboxylic acid or a dicarboxylic anhydride with polycondensation, the oxyalkylated fatty amine, the oxyalkylated polyhydric alkanol or the oxyalkylated polyamine and the dicarboxylic acid or the dicarboxylic anhydride being employed in the molar ratio 1:0.01:0.5 to 1:1:3, preferably 1:0.1:0.9 to 1:0.5:1.5, and reacting (quaternizing) the reaction product obtained (that is a nitrogen-containing branched polyoxyalkylene copolyester) with 1 to 6 moles, preferably 4 to 5 moles, of ethylene oxide or propylene oxide per mole of nitrogen-containing monomer units in the reaction product, in the presence of an equimolar amount, relative to the nitrogen-containing monomer units in the reaction product, of a mineral acid or carboxylic acid (the mineral acid or carboxylic acid providing the anion for the quaternization).

Preferred oxyalkylated, primary fatty amines of the above-mentioned formula are those in which $R^1$ is an alkyl radical having 12 to 18 carbon atoms, $R^2$ is H, and a and b are identical or different and are integers or fractions with a total of 2 to 15, taking into account the above-mentioned proviso.

Oxyalkylation of primary fatty amines is well known and can be carried out by one of the methods for oxyalkylation of acidic (active) H atom-carrying compounds. Depending on the meanings of $R^2$, the oxyalkylated fatty amines can carry units of ethylene oxide or propylene oxide or blockwise-arranged units of ethylene oxide and propylene oxide, the ethoxylated, i.e. carrying only ethylene oxide units, primary fatty amines being preferred. Depending on the meanings of $R^1$, the fatty amines employed for oxyalkylation can be single primary fatty amines or mixtures thereof. They can also be fatty amines whose hydrocarbon chain contains one or several double bonds, such as the radicals of oleic acid, elaidic acid, linoleic acid or linolenic acid. Preferred primary fatty amines are industrially available products, such as stearylamine, coconut fatty amine or tallow fatty amine (in these industrial products, alkyl radicals essentially having 12 to 18 carbon atoms are present).

The oxyalkylated, at least trihydric alkanol is preferably one from the group comprising glycerol, erythritol, pentaerythritol, trimethylolethane, trimethylolpropane, 1,3,5-hexanetriol, pentitol and hexitol, glycerol, pentaerythritol and trimethylolpropane being particularly preferred. The oxyalkylated polyols have 5 to 30, preferably 15 to 25, ethylene oxide units or 5 to 30, preferably 15 to 25, propylene oxide units, or 3 to 20, preferably 5 to 15, ethylene oxide units and 5 to 30, preferably 15 to 25, propylene oxide units per acidic H atom, i.e. per OH group. In the case of ethylene oxide and propylene oxide units, these are attached randomly or in blocks, preferably in blocks. Of the possible oxyalkylated alkanols, those are preferred which contain ethylene oxide and propylene oxide, and do so in blocks. Of these, those ethylene oxide/propylene oxide blocks are in turn preferred which comprise a first propylene oxide block having 5 to 30, preferably 15 to 25, propylene oxide units and a subsequent ethylene oxide block having 3 to 20, preferably 5 to 15, ethylene oxide units (per acidic H atom).

The oxyalkylated polyamine is preferably one from the group comprising ethylenediamine, diethylenetriamine, triethylenetetramine, tetraethylenepentamine and pentaethylenehexamine, and the corresponding propylene polyamines, ethylenediamine, propylendiamine, diethylenetriamine, triethylenetetramine, tetraethylenepentamine and the corresponding polypropylene polyamines being particularly preferred. The oxyalkylated polyamines, like the oxyalkylated polyols, have 5 to 30, preferably 15 to 25, ethylene oxide units or 5 to 30, preferably 15 to 25, propylene oxide units, or 3 to 20, preferably 5 to 15, ethylene oxide units and 5 to 30, preferably 15 to 25, propylene oxide units per acidic H atom. In the case of ethylene oxide and propylene oxide units, these are attached randomly or in blocks, preferably in blocks. Of the possible oxyalkylated polyamines, those are preferred which contain ethylene oxide and propylene oxide, and do so in blocks. Of these, those ethylene oxide/propylene oxide blocks are also in turn preferred here which comprise a first propylene oxide block having 5 to 30, preferably 15 to 25, propylene oxide units and a subsequent ethylene oxide block having 3 to 20, preferably 5 to 15, ethylene oxide units (per acidic H atom).

Like the above-mentioned oxyalkylation of fatty amines, the oxyalkylation of the polyols and polyamines in question is well known and can be carried out by one of the methods of oxyalkylating active H atom-carrying compounds. The dicarboxylic acids to be employed can be aromatic or aliphatic. The aliphatic dicarboxylic acids can be saturated or unsaturated. The aromatic dicarboxylic acid is preferably phthalic acid (benzene-ortho-dicarboxylic acid). The aliphatic saturated dicarboxylic acid is preferably one having $C_1$- to $C_8$-alkylene groups, in particular having $C_2$- to $C_4$-alkylene groups, such as malonic acid, succinic acid, glutaric acid, adipic acid, pimelic acid, suberic acid, azelaic acid and sebacic acid. The aliphatic unsaturated dicarboxylic acid is preferably fumaric acid or maleic acid. Of the dicarboxylic acids mentioned, the aliphatic, saturated dicarboxylic acids and maleic acid are preferred. With respect to the dicarboxylic anhydrides which can be employed in place of the acids, that applies which has been stated with respect to the dicarboxylic acid.

The quaternary, branched polyoxyalkylene copolyesters according to the invention are prepared by esterifying an oxyalkylated fatty amine of the type mentioned and an oxyalkylated alkanol or an oxyalkylated polyamine of the type mentioned using a dicarboxylic acid or a dicarboxylic anhydride of the type mentioned, the fatty amine, the alkanol or the polyamine and the dicarboxylic acid or the dicarboxylic anhydride being employed in the molar ratio 1:0.01:0.5 to 1:1:3, preferably 1:0.1:0.9 to 1:0.5:1.5, and quaternizing the esterification product obtained using 1 to 6 moles, preferably 4 to 5 moles, of ethylene oxide or propylene oxide per nitrogen atom in the esterification product, in the presence of a mineral acid or carboxylic acid in an amount equivalent to the number of nitrogen atoms in the esterification product (the acid employed provides the anion in the quaternization reaction; the number of nitrogen atoms in the esterification product can be determined, for example, by determining the amine value of the esterification product).

The esterification, proceeding with polycondensation, of the oxyalkylated fatty amines and oxyalkylated polyols or polyamines using a dicarboxylic acid or a dicarboxylic anhydride is carried out using a relatively high-boiling, inert solvent, such as toluene or xylene, or without solvent in the melt and with the cover of a protective gas, the reaction preferably being carried out in the melt. In the case of esterification in a solvent, the reflux temperature of the reaction mixture is expediently selected as the reaction temperature and the water of reaction which is formed is removed by azeotropic distillation. In the case of esterification without solvent, the water of reaction is removed directly from the reaction mixture (distilled off). The reaction temperatures here are 140° to 220° C., preferably 160° to 180° C.. In order to accelerate the reaction, an acid catalyst is used, as is expedient in esterification reactions. The course and end of the reaction can be checked with the aid of the water of reaction produced or by determining the amine and/or acid value. The branched polyoxyalkylene copolyesters obtained as reaction product are yellow to brown liquids of varying viscosity. They have a viscosity of 2,000 to 50,000 mPa.s, preferably 4,000 to 30,000 mPa.s. In order to quaternize the reaction product, the latter is reacted with ethylene oxide or propylkene oxide in the abovementioned amount, preferably with ethylene oxide, at a temperature of 60° to 100° C., preferably 75° to 85° C., an equimolar amount (corresponding to the nitrogen-containing monomer unit) of carboxylic acid or mineral acid being employed for salt formation. The degree of quaternization of the product obtained by quaternization can be determined, for example, by two-phase titration with sodium dodecylsulfate at pH 1 to 2, and pH 10 respectively. The branched, quaternary polyoxyalkylene copolyesters according to the invention which are obtained are yellow to brown liquids of varying viscosity and are characterized by their degree of quaternization.

A preferred process for the preparation of the novel quaternary, branched polyoxyalkylene copolyesters is described below in greater detail.

The oxyalkylated fatty amine, the oxyalkylated alkanol or the oxyalkylated polyamine and the dicarboxylic acid or the anhydride, and also an acid catalyst are introduced into a reaction vessel. Suitable acid catalysts are hydrohalic acids, such as hydrochloric acid or hydrobromic acid, phosphoric acids, such as hypophosphorous acid or orthophosphoric acid, sulfuric acid, sulfonic acids, such as methanesulfonic acid, para-toluenesulfonic acid or dodecylbenzenesulfonic acid, haloacetic acids, such as trichloroacetic acid or trifluoroacetic acid, and mixtures of these. Hydrochloric acid, phosphoric acids and sulfonic acids are preferred. The amount of the acid catalyst is generally 0.05 to 5% by weight, preferably 0.1 to 1% by weight, relative to the total of the weights of the three reaction components introduced. The mixture introduced into the reaction vessel is heated to 140° to 220° C., preferably 160° to 180° C., with stirring and while passing through an inert gas, preferably nitrogen, in order to produce an inert gas atmosphere, and is kept at this temperature (reaction temperature, esterification temperature) while continuously removing the water produced until the reaction is complete. The course and end of the reaction can be checked by one of the abovementioned methods. The reaction product, which can optionally be washed with water in order to remove the catalyst employed, is a yellow to brown liquid of varying viscosity. The reaction time is in the range of 5 to 30 hours.

The reaction product obtained by esterification (that is a branched polyoxyalkylene copolyester having nitrogen-containing monomer units) is quaternized in the aqueous phase, if appropriate with addition of a solvent, for example a short-chain monohydric alkanol having a boiling point which is above the quaternization temperature. The reaction product obtained by esterification and a mineral acid or carboxylic acid in an amount which is equimolar with the molecular weight of the nitrogen-containing monomer units in the reaction product are introduced into a suitable stirred autoclave and charged with ethylene oxide or propylene oxide, preferably ethylene oxide, at a temperature of 60° to 100° C., preferably 75° to 85° C., to be precise with 1 to 6 moles, preferably 4 to 5 moles, of ethylene oxide or propylene oxide, preferably ethylene oxide, per mole of nitrogen-containing monomer units in the reaction product employed for quaternization. During the charging step, a reaction pressure of about 3 bar is not exceeded for reasons of expediency. The mineral acids employed are preferably hydrohalic acids, such as hydrochloric acid and hydrobromic acid, phosphoric acids, such as phosphorous acid and phosphoric acid, sulfuric acid or sulfonic acids, such as toluenesulfonic acid and methanesulfonic acid, phosphoric acid being particularly preferred. The carboxylic acids employed are preferably aliphatic carboxylic acids having 1 to 6 carbon atoms, such as formic acid, acetic acid, propionic acid and butyric acid, aliphatic hydroxycarboxylic acids having 1 to 6 carbon atoms and 1 to 3 hydroxyl groups, such as glycolic acid and lactic acid, or aromatic carboxylic acids such as benzoic acid and salicylic acid. The carboxylic acid may also be an optionally OH-substituted di- or tricarboxylic acid, such as succinic acid, malonic acid, maleic acid, fumaric acid, malic acid, tartaric acid or citric acid. Particularly preferred acids are acetic acid, propionic acid, glycolic acid, lactic acid and phosphoric acid. The course and end of the reaction can be followed by the change in pressure in the reaction vessel. It is also possible to determine the degree of quaternization by one of the abovementioned methods, i.e. from the ratio of the acid and alkaline two-phase titrations with sodium dodecylsulfate. The reaction product is a yellow to brown liquid of varying viscosity and is the branched, quaternary polyoxyalkylene copolyesters according to the invention. The reaction time is in the range 10 to 20 hours.

The branched, quaternary polyoxyalkylene copolyesters according to the invention having three components, namely oxyalkylated, at least trihydric alkanol or oxyalkylated polyamine, oxyalkylated fatty amine and dicarboxylic acid, and quaternized with a certain amount of ethylene oxide or propylene oxide, have a specific chemical character and a highly branched structure. They have a degree of quaternization of 10 to 98%, preferably 30 to 70%.

The branched, quaternary polyoxyalkylene copolyesters according to the invention are distinguished by a high demulsifying action. At conventional crude oil processing temperatures, complete separation of water and reduction of the salt content are achieved after only a short separation time. Using the novel crude oil demulsifiers, acceptance-specific crude oils are thus obtained after a short separation time at conventional processing temperatures. The quaternary polyoxyalkylene copolyesters according to the invention, besides good and rapid demulsification, also produce high corrosion protection. Due to their corrosion-inhibiting action, the corrosion problems described initially are substantially eliminated when demulsifiers according to the invention are used. The amount of demulsifier according to the invention which is used can vary within broad limits. It depends, in particular, on the type of the crude oil and the processing temperature. The effective amount is generally 5 to 100 g per tonne, preferably 10 to 50 g per tonne. The new demulsifiers are preferably employed in solution for reasons of better dispensing and distribution. Suitable solvents are water or organic solvents, such as alcohols, for example methanol, isopropanol and butanol, aromatic hydrocarbons, for example toluene and xylene, and commercially available mixtures of higher aromatics.

The invention is now illustrated in greater detail by means of examples.

EXAMPLE 1

Preparation of the branched polyoxyalkylene copolyester: 203.0 g (0.30 mol) of a stearylamine containing (on average) 10 mol of ethylene oxide, 44.0 g (0.30 mol) of adipic acid and 307.0 g (0.066 mol) of a glycerol block oxyalkylate containing (on average) 22.7 mol of propylene oxide as the first block and 5.0 mol of ethylene oxide as the second block per acidic H atom, and also 4 ml of 37% strength by weight hydrochloric acid and 1 ml of 50% strength by weight hypophosphorous acid as esterification catalyst (i.e. 0.30% by weight of hydrochloric acid and 0.20% by weight of hypophosphorous acid, percentages by weight in each case relative to the reaction mixture introduced made up of ethoxylated stearylamine, adipic acid and the glycerol block oxyalkylate) were introduced into a 1 liter three-neck flask equipped with stirrer, water separater and internal thermometer. The molar ratio between the reaction components to be reacted, the ethoxylated fatty amine, the glycerol block oxyalkylate and the adipic acid was thus 1:0.22:1. The flask contents were heated to 180° C. with stirring and while passing through nitrogen in order to maintain a nitrogen atmosphere, and kept at this reaction temperature for 20 hours with stirring and under a water-pump vacuum, water of reaction continuously being removed. The esterification reaction was complete after the reaction time specified. A brown, viscous reaction product was present. The branched polyoxyalkylene copolyester thus obtained has a viscosity of 4,600 mPa.s at 25° C.

Quaternization of the polyester: 454.0 g of the polyoxyalkylene copolyester obtained (i.e. 0.25 mol, relative to the nitrogen-containing monomer units in the polyester) and 28.0 g (0.25 mol) of 80% strength by weight lactic acid, and also 13.0 g of water and 29.0 g of isobutanol as a solvent, were introduced into a 1 liter three-neck flask equipped with stirrer and internal thermometer. The flask contents were heated to 80° C. with stirring and charged at this temperature with 55.1 g (1.25 mol) of ethylene oxide while maintaining a maximum pressure of 2.5 bar and a total reaction time of 15 hours. Thus, the quaternization was carried out using 5 mol of ethylene oxide per mol of nitrogen-containing monomer units. The quaternization product was a pale brown liquid. The branched quaternary polyoxyalkylene copolyester thus obtained has a degree of quaternization of 68.5%.

EXAMPLE 2

Batch (for the preparation of polyoxyalkylene copolyester): 150.0 g (0.50 mol) of coconut acid fatty amine containing 2 mol of ethylene oxide, 465.0 g (0.10 mol) of glycerol block oxyalkylate according to Example 1, 80.4 g (0.55 mol) of adipic acid and an esterification catalyst as in Example 1. The molar ratio between the reaction components to be reacted was thus 1:0.2:1.1. The esterification was carried out as in Example 1, with the difference that a temperature of 160° C. and a reaction time of 9 hours were maintained. The viscosity of the branched polyoxyalkylene copolyester obtained was 5,300 mPa.s at 25° C.

Batch for the quaternization: 412.0 g (0.30 mol) of polyoxyalkylene copolyester, 39.3 g (0.30 mol) of 58% strength by weight glycolic acid, 10.0 g of water and 28.0 g of isobutanol. Quaternization with 66.0 g (1.5 mol) of ethylene oxide, i.e. 5 mol of ethylene oxide per mol of nitrogen-containing monomer units. The quaternization was carried out as in Example 1. The degree of quaternization of the branched quaternary polyoxyalkylene copolyester, which was obtained as a pale brown liquid, was 67.5%.

EXAMPLE 3

Batch: 112.0 g (0.30 mol) of tallow fatty amine containing 2 mol of ethylene oxide, 598.0 g (0.11 mol) of pentaerythritol block oxyalkylate containing 18.5 mol of propylene oxide as the first block and 7 mol of ethylene oxide as the second block per acidic H atom, 52.6 g (0.36 mol) of adipic acid and 2 ml of methanesulfonic acid as catalyst. The molar ratio between the reaction components to be reacted was thus 1:0.37:1.2. The esterification was carried out as in Example 1, with the difference that a temperature of 160° C. and a reaction time of 12 hours were maintained. The viscosity of the branched polyoxyalkylene copolyester obtained was 4,400 mPa.s at 25° C.

Batch for the quaternization: 510.0 g (0.20 mol) of polyoxyalkylene copolyester, 26.2 g (0.2 mol) of 58% strength by weight glycolic acid, 7.0 g of water and 31.0 g of isobutanol. Quaternization with 44.0 g (1.0 mol) of ethylene oxide, i.e. 5 mol of ethylene oxide per mol of nitrogen-containing monomer units. The quaternization was carried out as in Example 1, with the difference that a reaction time of 14 hours was maintained. The degree of quaternization of the branched quaternary polyoxyalkylene copolyester, which was obtained as a pale brown liquid, was 62.0%.

EXAMPLE 4

Batch: 197.0 g (0.30 mol) of tallow fatty amine containing 10 mol of ethylene oxide, 300.0 g (0.06 mol) of pentaerythritol block oxyalkylate containing 16 mol of propylene oxide as the first block and 7 mol of ethylene oxide as the second block per acidic H atom, 29.4 g (0.30 mol) of maleic anhydride and 2 ml of methanesulfonic acid as catalyst. The molar ratio between the reaction components to be reacted was thus 1:0.2:1. The esterification was carried out as in Example 1, with the difference that a temperature of 160° C. and a reaction time of 7 hours were maintained. The viscosity of the branched polyoxyalkylene copolyester obtained was 10,800 mPa.s at 25° C.

Batch for the quaternization: 358.0 g (0.20 mol) of polyoxyalkylene copolyester, 22.5 g (0.20 mol) of 80% strength by weight lactic acid, 10.0 g of water and 23.0 g of isobutanol. Quaternization with 35.5 g (0.80 mol) of ethylene oxide, i.e. 4 mol of ethylene oxide per mol of nitrogen-containing monomer units. The quaternization was carried out as in Example 1, with the difference that a reaction time of 12 hours was maintained. The degree of quaternization of the branched quaternary polyoxyalkylene copolyester, which was obtained as a pale brown liquid, was 65.5%.

EXAMPLE 5

Batch: 148.0 g (0.40 mol) of tallow fatty amine containing 2 mol of ethylene oxide, 374.0 g (0.09 mol) of trimethylolpropane block oxyalkylate containing 19 mol of propylene oxide as the first block and 5.3 mol of ethylene oxide as the second block per acidic H atom, 37.3 g (0.38 mol) of maleic anhydride and an esterification catalyst as in Example 1. The molar ratio between the reaction components to be reacted was thus 1:0.23:0.95. The esterification was carried out as in Example 2. The viscosity of the branched polyoxyalkylene copolyester obtained was 21,000 mPa.s at 25° C.

Batch for the quaternization: 360.0 g (0.25 mol) of polyoxyalkylene copolyester, 16.0 g (0.25 mol) of acetic acid, 18.0 g of water and 21.0 g of isobutanol. Quaternization with 50.6 g (1.15 mol) of ethylene oxide, i.e. 4.6 mol of ethylene oxide per mol of nitrogen-containing monomer unit. The quaternization was carried out as in Example 4. The degree of quaternization of the branched quaternary polyoxyalkylene copolyester, which was obtained as a pale brown liquid, was 30.2%.

EXAMPLE 6

Batch: 119.0 g (0.20 mol) of stearylamine containing 8 mol of ethylene oxide, 520.0 g (0.10 mol) of ethylenediamine block oxyalkylate containing 18.8 mol of propylene oxide as the first block and 5 mol of ethylene oxide as the second block per acidic H atom, 19.6 g (0.20 mol) of maleic anhydride and an esterification catalyst as in Example 1. The molar ratio between the reaction components to be reacted was thus 1:0.5:1. The esterification was carried out as in Example 2. The viscosity of the branched polyoxyalkylene copolyester obtained was 23,000 mPa.s at 25° C.

Batch for the quaternization: 415.0 g (0.25 mol) of polyoxyalkylene copolyester, 28.8 g (0.25 mol) of 85% strength by weight phosphoric acid ($H_3PO_4$), 14.0 g of water and 27.0 g of isobutanol. Quaternization with 44.1 g (1.0 mol) of ethylene oxide, i.e. 4 mol of ethylene oxide per mol of nitrogen-containing monomer units. The quaternization was carried out as in Example 4. The degree of quaternization of the branched quaternary polyoxyalkylene copolyester, which was obtained as a pale brown liquid, was 36.8%.

EXAMPLE 7

Batch: 203.0 g (0.30 mol) of stearylamine containing 10 mol of ethylene oxide, 317.0 g (0.06 mol) of ethylenediamine block oxyalkylate containing 16.8 mol of propylene oxide as the first block and 7.5 mol of ethylene oxide as the second block per acidic H atom, 33.2 g (0.30 mol) of phthalic acid and 4 ml of 37% strength by weight hydrochloric acid as catalyst. The molar ratio between the reaction components to be reacted was thus 1:0.2:1. The esterification was carried out as in Example 1, with the difference that a temperature of 160° C. and a reaction time of 18 hours were maintained. The viscosity of the branched polyoxyalkylene copolyester obtained was 8,600 mPa.s at 25° C.

Batch for the quaternization: 336.0 g (0.25 mol) of polyoxyalkylene copolyester, 18.5 g (0.25 mol) of propionic acid, 18.0 g of water and 24.0 g of isobutanol. Quaternization with 55.1 g (1.25 mol) of ethylene oxide, i.e. 5 mol of ethylene oxide per mol of nitrogen-containing monomer units. The quaternization was carried out as in Example 1, with the difference that a reaction time of 10 hours was maintained. The degree of quaternization of the branched quaternary polyoxyalkylene copolyester, which was obtained as a pale brown liquid, was 52.0%.

Although oxyalkylation of acidic H atom-carrying compounds, such as fatty amines, alkanols and polyamines, has been well known for a long time, the preparation of the oxyalkylated fatty amines, alkanols and oxyalkylated polyamines used according to the invention is nevertheless described here briefly: Oxyalkylation of the compounds in question is generally carried out by charging the compound with the oxyalkylation agent, i.e. ethylene oxide and/or propylene oxide, at a temperature of 100° to 150° C. in the presence of a basic catalyst, preferably potassium hydroxide or sodium hydroxide, in an amount of about 0.1 to 5% by weight, relative to the amount by weight of the compound to be oxyalkylated, the pressure produced by the reaction components at the reaction temperature being produced. The end of the reaction can be detected, for example, from the reduced and constant pressure. The oxyalkylated compound can, if desired, be freed from the catalyst, for example by washing with water.

The demulsifying action of the branched, quaternary polyoxyalkylene polyesters of Examples 1 to 7 according to the invention was tested using various crude oil emulsions. The test results are collated in Tables I and II below. They show that the products according to the invention are excellent crude oil demulsifiers.

Furthermore, the corrosion-inhibiting action of the products of Examples 1 to 7 according to the invention was tested. In this test, the weight loss of carbon steel coupons with surface area 20 cm² was determined. The coupons were dipped for 6 hours into water containing 20% by weight of sodium chloride at 60° C. During the experiment, a stream of carbon dioxide was bubbled through the constantly stirred solution. The inhibition is given in percent, the blank value without inhibitor being the reference quantity 0% (this corresponds to 100% weight loss). The test results are collated in Table III below. They show the excellent corrosion inhibition of the products according to the invention.

TABLE I

| Origin of the crude oil emulsion: | | | | Columbia | | | |
| --- | --- | --- | --- | --- | --- | --- | --- |
| Water content of the crude oil emulsion: | | | | 12.5% by volume | | | |
| Demulsification temperature: | | | | 48° C. | | | |
| Amount added: | | | | 18 ppm | | | |
| Product of example | Water separation in % by volume after minutes | | | | | | Residual water content in % by volume in the oil phase |
| | 10 | 20 | 30 | 60 | 120 | 180 | |
| 1 | 20 | 61 | 83 | 100 | 100 | 100 | 0.06 |
| 2 | 10 | 15 | 20 | 99 | 100 | 100 | 0.15 |
| 3 | 39 | 60 | 82 | 98 | 100 | 100 | 0.07 |
| 4 | 40 | 47 | 58 | 85 | 98 | 99 | 0.22 |
| 7 | 56 | 68 | 79 | 89 | 95 | 96 | 0.36 |
| Blank value | 0 | 0 | 0 | 0 | 0 | 0 | 3.84 |

TABLE II

| Origin of the crude oil emulsion: | | | | | | Dubai | |
| --- | --- | --- | --- | --- | --- | --- | --- |
| Water content of the crude oil emulsion: | | | | | | 28.7% by volume | |
| Demulsification temperature: | | | | | | 38.5° C. | |
| Amount added: | | | | | | 22 ppm | |
| Product of example | Water separation in % by volume after minutes | | | | | | Residual water content in % by volume in the oil phase |
| | 5 | 10 | 20 | 40 | 60 | 80 | |
| 1 | 61 | 78 | 91 | 98 | 100 | 100 | 0.01 |
| 3 | 82 | 83 | 90 | 96 | 97 | 100 | 0.02 |
| 4 | 79 | 82 | 87 | 92 | 95 | 98 | 0.06 |
| 5 | 40 | 62 | 83 | 93 | 99 | 100 | 0.03 |
| 6 | 48 | 61 | 75 | 88 | 100 | 100 | 0.02 |
| Blank value | 0 | 0 | 0 | 0 | 0 | 0 | 2.49 |

TABLE III

| Product from example | Amount employed | | |
| --- | --- | --- | --- |
| | 10 ppm | 40 ppm % inhibition | 60 ppm |
| 1 | 81.8 | 89.9 | 91.6 |
| 2 | 89.5 | 90.0 | 95.8 |
| 3 | 84.5 | 93.2 | 96.6 |
| 5 | 86.4 | 86.8 | 87.6 |
| 7 | 81.9 | 86.0 | 88.9 |

We claim:

1. A branched, quaternary polyoxyalkylene copolyester said copolyester having been prepared by esterifying an OH-containing component and a dicarboxylic component in the presence of a mineral acid or carboxylic acid esterification catalyst while removing the water of reaction, and then quaternization the thus-esterified product, the esterification reaction being carried out in the melt at a temperature of 160° to 180° C., and said quaternization being carried out in an aqueous phase at a temperature of 75° to 85° C., said OH-containing component consisting essentially of:

an oxyalkylated primary fatty amine of formula I

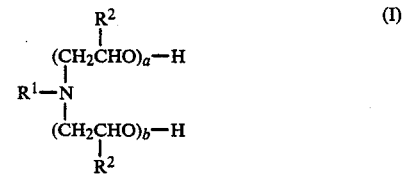

in which $R^1$ is an alkyl radical or alkylene radical having 8 to 23 carbon atoms;
$R^2$ to is H, in which case the polyoxyalkylene radicals of formula I are polyoxyethylene, or $R^2$ is $CH_3$, in which case the polyoxyalkylene radicals of formula I are polyoxypropylene, or $R^2$ is both H and $CH_3$, in which case the polyoxyalkylene radicals of Formula I are the same or different and can carry blockwise-arranged units of ethylene oxide and propylene oxide; and
a and b are identical or different and are integers or fractions with a total of 2 to 30, with the proviso that neither a nor b is zero; and
an alkyoxylated polyhydric alkanol having 3 to 6 OH groups or an alkoxylated, at least trifunctional polyamine, which in each case contains 5 to 30 ethylene oxide units, 5 to 30 propylene oxide units, or 3 to 20 ethylene oxide units and 5 to 30 propylene oxide units per acid H atom, said dicarboxylic component consisting essentially of a dicarboxylic acid or a dianhydride thereof, said dicarboxylic acid being malonic, succinic, glutaric, adipic, pimelic, suberic, azelaic, sebacic, fumaric, maleic, or phtalic acid;

the oxyalkylated primary fatty amine, the alkyoxylated polyhydric-alkanol or polyamine reactant, and the dicarboxylic component being employed in the molar ratio 1:0.01:0.5 to 1:1:3; the thus-esterfied product being quarternized by reaction with 1 to 6 moles of ethylene oxide or propylene oxide per mole of nitrogen-containing monomer units in the said esterified product, in the presence of an equimolar amount, relative to the nitrogen-containing monomer units in said esterified product, of a mineral acid or a $C_1$-$C_6$ carboxylic acid.

2. A polyoxyalkylene copolyester as claimed in claim 1, wherein the trihydric alkanol and the polyamine contain 15 to 25 ethylene oxide units, 15 to 25 propylene oxide units or 5 to 15 ethylene oxide units and 15 to 25 propylene oxide units per acidic H atom, the alkanol being glycerol, erythritol, pentaerythritol, trimethylolethane, trimethylolpropane, 1,3,5-hexanetriol, a pentitol or a hexitol, and the polyamine being ethylenediamine, diethylenetriamine, triethylenetetramine, tetraethylenepentamine, pentaethylenehexamine or a corresponding propylene polyamine, and wherein the dicarboxylic acid is malonic acid, succinic acid, glutaric acid, adipic acid, pimelic acid, suberic acid, azelaic acid, sebacic acid, fumaric acid, maleic acid or phthalic acid, and the dicarboxylic anhydride is an anhydride of the dicarboxylic acids mentioned, and furthermore wherein the reaction product obtained is reacted with 4 to 5 moles of ethylene oxide or propylene oxide per mole of nitrogen-containing monomer units in the reaction product, in the presence of a hydrohalic acid, phosphoric acid, sulfuric acid, or a sulfonic acid as the mineral acid or in the presence of an aliphatic carboxylic acid having 1 to 6 carbon atoms or an aliphatic hydroxycarboxylic acid having 1 to 6 carbon atoms as the carboxylic acid.

3. A polyoxyalkylene copolyester as claimed in claim 1, wherein the trihydric alkanol and the polyamine contain 15 to 25 ethylene oxide units, 15 to 25 propylene oxide units or 5 to 15 ethylene oxide units and 15 to 25 propylene oxide units per acidic H atom, the alkanol being glycerol, pentaerythritol or trimethylolpropane and the polyamine being ethylenediamine, diethlenetriamine, triethylenetetramine, tetraethylenepentamine or a corresponding propylene polyamine, and wherein the dicarboxylic acid is succinic acid, glutaric acid, adipic acid, maleic acid or phthalic acid, and the dicarboxylic anhydride is an anhydride of the dicarboxylic acids mentioned, and furthermore wherein the reaction product obtained is reacted with 4 to 5 moles of ethylene oxide or propylene oxide per mole of nitrogen-containing monomer units in the reaction product, in the presence of acetic acid, propionic acid, glycolic acid, lactic acid or phosphoric acid.

4. A polyoxyalkylene copolyester as claimed in claim 1, wherein the oxyalkylated fatty amine employed is one which is produced when $R^1$ is an alkyl radical having 12 to 18 carbon atoms, $R^2$ is H and a and b are identical or different and are integers or fractions with a total of 2 to 15, the oxyalkylated trihydric alkanol employed is glycerol, pentaerythritol or trimethylolpropane containing a first block made from 15 to 25 propylene oxide units and a subsequent block made from 5 to 15 ethylene oxide units, the oxyalkylated polyamine is ethylenediamine, diethylenetriamine, triethylenetetramine, tetraethylenepentamine or a corresponding propylene polyamine containing a first block made from 15 to 25 propylene oxide units and a subsequent block made from 5 to 15 ethylene oxide units, and the dicarboxylic acid or dicarboxylic anhydride is succinic acid, glutaric acid, adipic acid, maleic acid or phthalic acid, or an anhydride of these dicarboxylic acids respectively, and wherein the reaction product obtained is reacted with 4 to 5 moles of ethylene oxide per mole of nitrogen-containing monomer units in the reaction product, in the presence of acetic acid, propionic acid, glycolic acid, lactic acid or phosphoric acid.

5. A process for breaking crude oil emulsions, wherein an effective amount of a polyoxyalkylene copolyester as claimed in claim 1 is fed to the crude emulsions.

6. A process for corrosion inhibition in equipment for transporting and processing crude oil, wherein an effective amount of a polyoxyalkylene copolyester as claimed in claim 1 is added to the crude oil.

7. A polyoxyalkylene copolyester as claimed in claim 1, wherein said OH-containing component consists essentially of the oxyalkylated primary fatty amine and an alkoxylated polyhydric alkanol having 3 to 6 OH groups.

8. A polyoxyalkylene copolyester as claimed in claim 1, wherein said esterified product has been quaternized in presence of the $C_1$-$C_6$ carboxylic acid.

9. A polyoxyalkylene copolyester as claimed in claim 8, wherein said OH-containing component consists essentially of the alkoxylated primary fatty amine and an alkoxylated polyhydric alkanol having 3 to 6 OH groups.

10. A polyoxalkylene copolyester as claimed in claim 9, wherein the carboxylic acid which was present during the quaternization is a $C_1$-$C_6$ aliphatic carboxylic acid or a $C_1$-$C_6$ aliphatic hydroxycarboxylic acid.

11. A polyoxyalkylene copolyester as claimed in claim 9, wherein the polyhydric alkanol is glycerol, erythritol, pentaerythritol, triethylolthane trimethylolpropane, 1,3,5-hexanetriol, a pentitol or a hexitol.

12. A polyoxyalkylene copolyester as claimed in claim 9, wherein said esterified product has been quaternized by reaction with 4 to 5 moles of ethylene oxide or propylene oxide per mole of nitrogen-containing monomer units in said esterification product.

13. A polyoxyalkylene copolyester as claimed in claim 9, wherein said copolyester is obtained from said oxyalkylated primary fatty amine, said alkoxylated polyhydric alkanol, and the dicarboxylic component.

14. A polyoxyalkylene copolyester as claimed in claim 13, wherein the molar ratio of oxyalkylated primary fatty amine to alkoxylated polyhydric alkanol to dicarboxylic component is 1:0.1:0.9 to 1:0.5:1.5.

15. A polyoxyalkylene copolyester as claimed in claim 7, wherein the molar ratio of oxyalkylated primary fatty amine to alkoxylated polyhydric alkanol to dicarboxylic acid component is 1:0.1:0.9 to 1:0.5:1.5.

* * * * *